(12) United States Patent
Fukunaga et al.

(10) Patent No.: US 11,913,341 B2
(45) Date of Patent: Feb. 27, 2024

(54) CLEARANCE CONTROL SYSTEM FOR GAS TURBINE

(71) Applicant: MITSUBISHI HEAVY INDUSTRIES, LTD., Tokyo (JP)

(72) Inventors: Yuya Fukunaga, Kanagawa (JP); Susumu Wakazono, Kanagawa (JP); Satoshi Hada, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/018,698

(22) PCT Filed: Sep. 7, 2021

(86) PCT No.: PCT/JP2021/032762
§ 371 (c)(1),
(2) Date: Jan. 30, 2023

(87) PCT Pub. No.: WO2022/054777
PCT Pub. Date: Mar. 17, 2022

(65) Prior Publication Data
US 2023/0296030 A1    Sep. 21, 2023

(30) Foreign Application Priority Data

Sep. 8, 2020  (JP) ................ 2020-150225

(51) Int. Cl.
*F01D 11/24*   (2006.01)
*F02C 7/18*    (2006.01)

(52) U.S. Cl.
CPC ............. *F01D 11/24* (2013.01); *F02C 7/18* (2013.01); *F05D 2220/32* (2013.01); *F05D 2240/55* (2013.01); *F05D 2260/232* (2013.01)

(58) Field of Classification Search
CPC .............. F01D 11/24; F01D 11/20; F02C 7/18
See application file for complete search history.

(56) References Cited

U.S. PATENT DOCUMENTS

| 9,157,331 B2 * | 10/2015 | Laurello ................ F01D 11/24 |
| 9,255,490 B2 * | 2/2016  | Mizukami ............. F01D 11/24 |
| 2001/0023581 A1 | 9/2001 | Ojiro et al. |
| 2001/0031199 A1 | 10/2001 | Tanaka et al. |

(Continued)

FOREIGN PATENT DOCUMENTS

| JP | 11-50809 | 2/1999 |
| JP | 11-107705 | 4/1999 |

(Continued)

OTHER PUBLICATIONS

International Search Report dated Nov. 9, 2021 in International Application No. PCT/JP2021/032762.

*Primary Examiner* — Michael L Sehn
(74) *Attorney, Agent, or Firm* — Wenderoth, Lind & Ponack, L.L.P.

(57) ABSTRACT

In a clearance control system for a gas turbine, a control device operates an adjustment device such that a first flow rate is greater than a second flow rate when a load stable state is entered in which a fluctuation range of a load shifts within a preset range, and operates the adjustment device such that the second flow rate is greater than the first flow rate when a load fluctuation state is entered in which the load falls outside the range.

6 Claims, 6 Drawing Sheets

(56) References Cited

U.S. PATENT DOCUMENTS

| | | |
|---|---|---|
| 2011/0135456 A1 | 6/2011 | Takahashi et al. |
| 2015/0285088 A1 | 10/2015 | Ballard, Jr. et al. |
| 2015/0308282 A1 | 10/2015 | Bacic et al. |
| 2016/0333743 A1 | 11/2016 | Yamazaki et al. |
| 2018/0340468 A1 | 11/2018 | Takamura et al. |
| 2020/0173373 A1 | 6/2020 | Ferns et al. |
| 2021/0079846 A1 | 3/2021 | Hashimoto et al. |

FOREIGN PATENT DOCUMENTS

| | | |
|---|---|---|
| JP | 11-125199 | 5/1999 |
| JP | 11-190229 | 7/1999 |
| JP | 2000-291449 | 10/2000 |
| JP | 2001-248406 | 9/2001 |
| JP | 2002-4807 | 1/2002 |
| JP | 2013-32758 | 2/2013 |
| JP | 2013-142343 | 7/2013 |
| JP | 2013-245604 | 12/2013 |
| JP | 2014-58979 | 4/2014 |
| JP | 2014-95371 | 5/2014 |
| JP | 2015-140690 | 8/2015 |
| JP | 2015-200307 | 11/2015 |
| JP | 2016-75177 | 5/2016 |
| JP | 2018-193906 | 12/2018 |
| JP | 2019-56360 | 4/2019 |
| WO | 2010/084573 | 7/2010 |
| WO | 2017/090709 | 6/2017 |

\* cited by examiner

CLEARANCE CONTROL SYSTEM FOR GAS TURBINE

TECHNICAL FIELD

The present disclosure relates to a clearance control system for a gas turbine.

This application claims the priority of Japanese Patent Application No. 2020-150225 filed on Sep. 8, 2020, the content of which is incorporated herein by reference.

BACKGROUND

Patent Document 1 describes a gas turbine in which a blade ring is cooled during rated operation to reduce a clearance between a stationary part and a rotary part of a turbine.

CITATION LIST

Patent Literature

Patent Document 1: JP2014-58979A

SUMMARY

Technical Problem

However, there is a problem that it is impossible to deal with an excessive decrease in clearance which is caused by an abrupt change in load of a gas turbine, if the blade ring remains cooled during the rated operation.

In view of the above, an object of at least one embodiment of the present disclosure is to provide a clearance control system for a gas turbine that can deal with a case where a load of the gas turbine fluctuates.

Solution to Problem

In order to achieve the above object, a clearance control system for a gas turbine according to the present disclosure is a clearance control system for a gas turbine for controlling, in the gas turbine that includes a compressor for producing compressed air; a combustor for burning fuel with the compressed air, and a turbine driven by a combustion gas generated by burning the fuel in the combustor, a clearance between a stationary part and a rotary part of the turbine, including: a cooling passage which is formed in the stationary part and through which a cooling medium for cooling the stationary part flows; a combustor internal flow passage which communicates with the cooling passage downstream of the cooling passage in a flow direction of the cooling medium and is formed in the combustor; a supply device for supplying the cooling medium to at least either the cooling passage or the combustor internal flow passage; an adjustment device for adjusting a first flow rate which is a flow rate of the cooling medium flowing through the cooling passage, and a second flow rate which is a flow rate of the cooling medium bypassing the cooling passage and flowing through the combustor internal flow passage; and a control device for detecting a load of the gas turbine and operating the adjustment device on the basis of the load. The control device operates the adjustment device such that the first flow rate is greater than the second flow rate when a load stable state is entered in which a fluctuation range of the load shifts within a preset range; and operates the adjustment device such that the second flow rate is greater than the first flow rate when a load fluctuation state is entered in which the load falls outside the range.

Advantageous Effects

According to a clearance control system for a gas turbine of the present disclosure, although a clearance may excessively decrease if a load of a gas turbine fluctuates, a cooling amount for a stationary part of a turbine is reduced in such a case, making it possible to deal with the case where the load of the gas turbine fluctuates.

DETAILED DESCRIPTION

Hereinafter, a clearance control system for a gas turbine according to embodiments of the present disclosure will be described with reference to the drawings. The embodiments each indicate one aspect of the present disclosure, do not intend to limit the disclosure, and can optionally be modified within a scope of a technical idea of the present disclosure.

<Configuration of Clearance Control System for Gas Turbine According to Embodiment of Present Disclosure>

Figure 1:
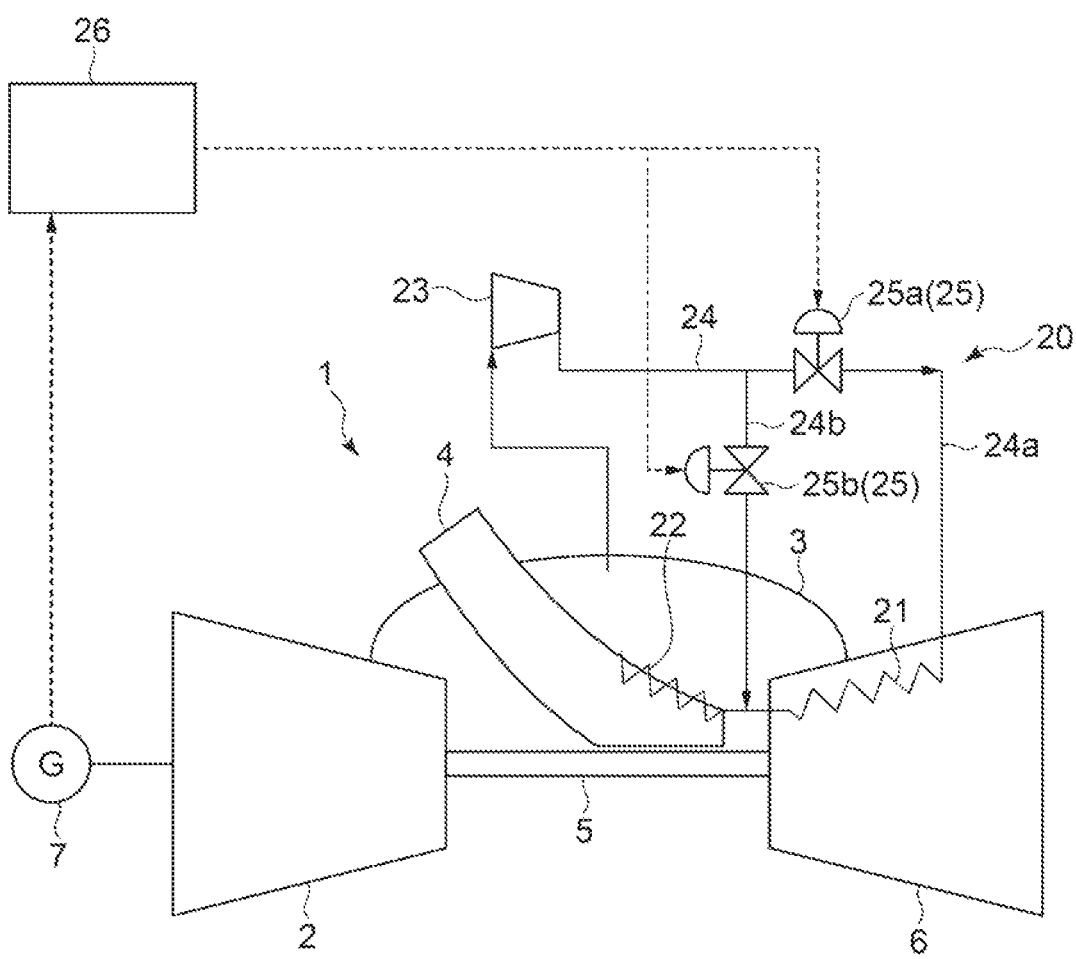
FIG. 1 is a configuration schematic diagram of a clearance control system for a gas turbine according to an embodiment of the present disclosure.

As shown in FIG. 1, a gas turbine 1 includes a combustor 4 for burning fuel to generate a combustion gas, a compressor 2 for supplying compressed air serving as combustion air to the combustor 4, and a turbine 6 which shares a common rotational shaft 5 with the compressor 2 and is configured to be driven by the combustion gas generated by the combustor 4. The rotational shaft 5 is connected to a generator 7, and the generator 7 is configured to be driven by an output of the turbine 6.

Figure 2:
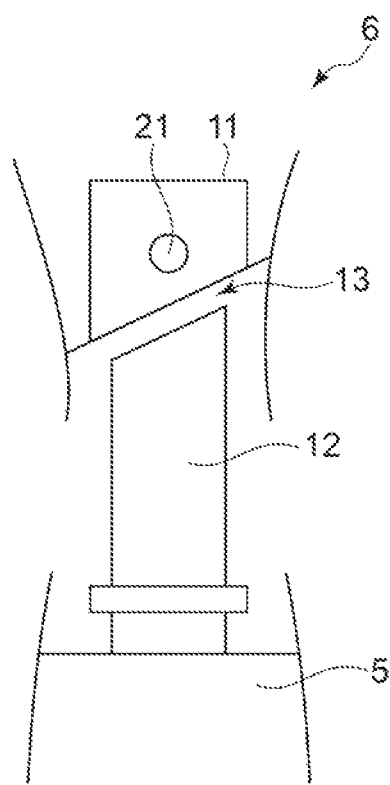
FIG. 2 is a view showing the configuration in a turbine of the gas turbine according to an embodiment of the present disclosure.

As shown in FIG. 2, in the turbine 6, a gap, that is, a clearance 13 is formed between a blade ring 11 serving as a stationary part and a rotor blade 12 serving as a rotary member. In the blade ring 11, a cooling passage 21 is formed where a cooling medium, which will be described later, flows. The cooling medium flows through the cooling passage 21, thereby cooling the blade ring 11. By changing the flow rate of the cooling medium flowing through the cooling passage 21 of the blade ring 11, the cooling amount for the blade ring 11 is changed and the size of the clearance 13 is controlled. In general, the clearance 13 decreases if the cooling amount for the blade ring 11 increases during the operation of the gas turbine 1, and the clearance 13 increases if the cooling amount decreases.

As shown in FIG. 1, a clearance control system 20 is for controlling the size of the clearance 13 (see FIG. 2) by adjusting the cooling amount for the blade ring 11, The clearance control system 20 includes the cooling passage 21, a combustor internal flow passage 22 formed in the combustor 4, an external compressor 23 for bleeding air in a casing 3 of the gas turbine 1 as a cooling medium and increasing a pressure, a supply passage 24 whose one end is connected to the external compressor 23 and whose another end is branched into a first passage 24a and a second passage 24b respectively connected to the cooling passage 21 and the combustor internal flow passage 22, and flow control valves 25a and 25b respectively disposed on the first passage 24a and the second passage 24b, and a control device 26. In a flow direction of the cooling medium flowing through the supply passage 24, the cooling passage 21 and the combustor internal flow passage 22 communicate with each other such that the combustor internal flow passage 22 is located downstream of the cooling passage 21. The control device 26 is electrically connected to the generator 7, and the flow control valves 25a and 25b. As will be described later, the flow control valves 25a and 25b respectively control a first flow rate which is the flow rate of the cooling medium flowing through the cooling passage 21, and a second flow rate which is the flow rate of the cooling medium bypassing the cooling passage 21 and flowing through the combustor internal flow passage 22, and thus, the flow control valves 25a and 25b constitute an adjustment device 25.

<Operation of Clearance Control System for Gas Turbine According to Embodiment of Present Disclosure>

Next, an operation of the clearance control system 20 according to an embodiment of the present disclosure will be described. As shown in FIG. 1, if the gas turbine 1 is started, the compressed air generated by the compressor 2 is supplied to the combustor 4 to burn fuel and generate a combustion gas. The combustion gas is supplied to turbine 6 to drive the turbine 6. The generator 7 is driven with the rotation of the rotational shaft 5 by the rotation of the turbine 6.

Figure 3:
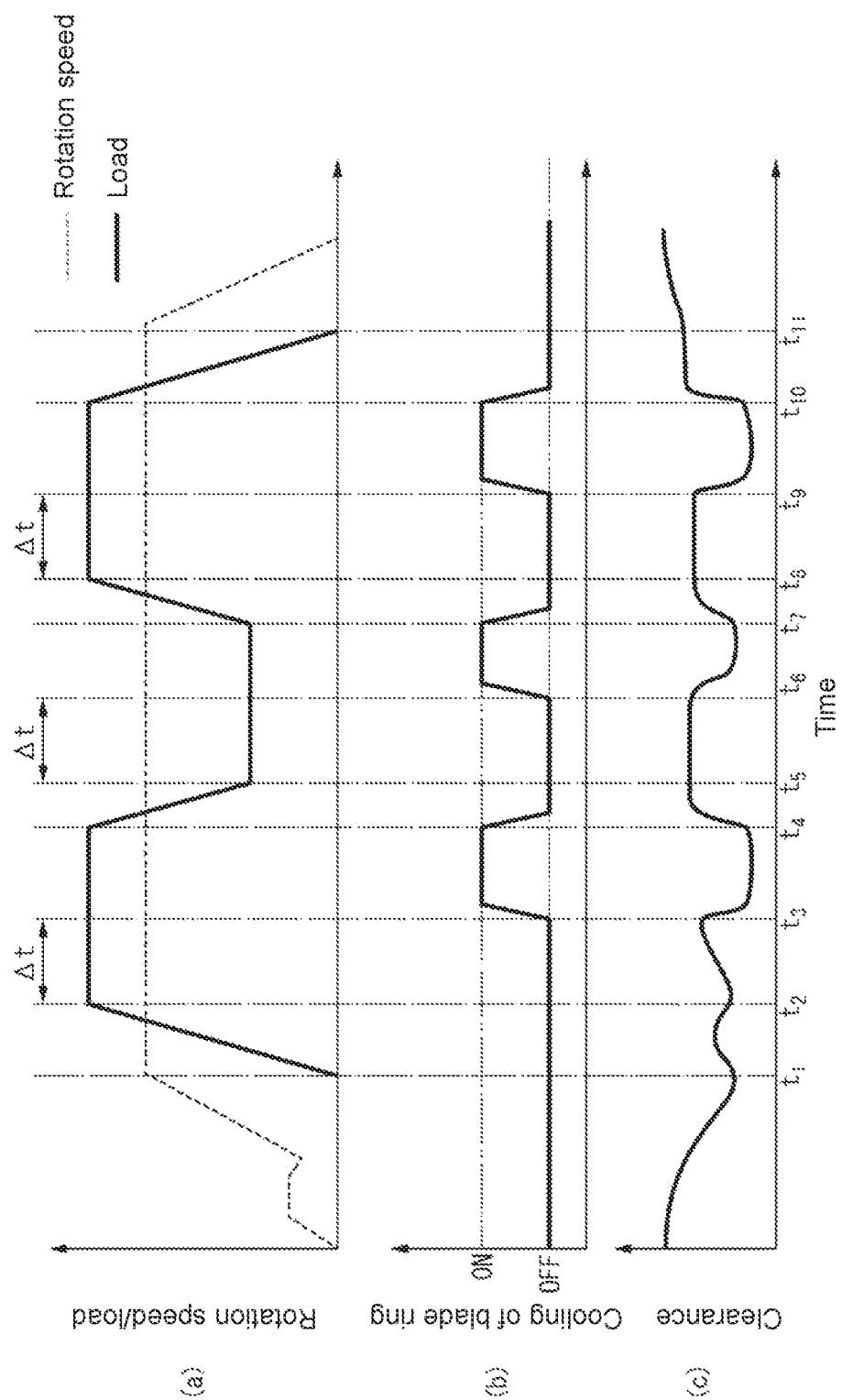
FIG. 3 is a group of graphs for describing an operation of the clearance control system for the gas turbine according to an embodiment of the present disclosure.
Figure 4:
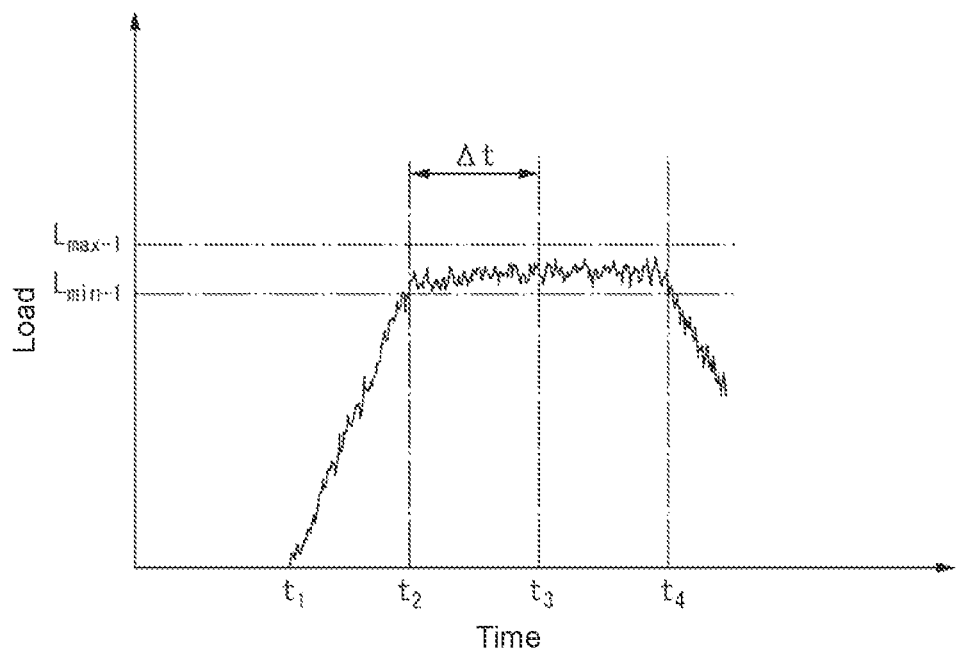
FIG. 4 is a graph for describing a load stable state in the gas turbine according to an embodiment of the present disclosure.

As shown in graph (a) of FIG. 3, after the gas turbine 1 is started, the rotation speed of the gas turbine 1 increases, and when a state of a no-load rated speed operation is entered at time $t_1$, the generator 7 is added to a utility grid (not shown) (load addition). After the load addition, the load of gas turbine 1 increases, and the load stabilizes at time $t_2$. The load of the gas turbine 1 is detected by the control device 26 on the basis of a power generation amount of the generator 7. In graph (a) of FIG. 3, a state where the load is stable after the time $t_2$ is simply depicted as a horizontal straight line with no load fluctuation. In reality, however, the load fluctuates within a certain range even in the state where the load is constant after the time $t_2$. For example, as shown in FIG. 4, the load fluctuates within a range defined by a first upper limit value $L_{max-1}$ and a first lower limit value $L_{min-1}$ of the load, A moving average line of the load thus fluctuating is shown in graph (a) of FIG. 3 as a shift of the load.

In the present embodiment, if the state where the load fluctuates within the range between the first upper limit value $L_{max-1}$ and the first lower limit value $L_{min-1}$ continues for a prescribed time $\Delta t$, the control device 26 determines that it is the state where the load of the gas turbine 1 is stable (load stable state). In the present embodiment, the prescribed time $\Delta t$ will be described as a predetermined time preset in the control device 26.

As shown in graph (b) of FIG. 3, if the state continues where the load fluctuates within the range between the first upper limit value $L_{max-1}$ and the first lower limit value $L_{min-1}$ from the time $t_2$ until the elapse of the prescribed time $\Delta t$, that is, when the gas turbine 1 enters the load stable state at time $t_3$, the control device 26 starts cooling the blade ring 11.

Next, the cooling operation of the blade ring 11 will be described. As shown in FIG. 1, the control device 26 fully closes the flow control valve 25a and fully opens the flow control valve 25b until the gas turbine 1 enters the load stable state (until the time $t_3$ in FIG. 3). The air in the casing 3 of the gas turbine 1 bled as the cooling medium is pressurized by the external compressor 23 and flows through the supply passage 24 but only flows through the second passage 24b, and flows through the combustor internal flow passage 22. In this case, the cooling medium bypasses the cooling passage 21 and does not flow therethrough, and thus the blade ring 11 (see FIG. 2) is not cooled.

When the cooling of the blade ring 11 is started, the control device 26 fully opens the flow control valve 25a and fully closes the flow control valve 25b. Then, the cooling medium flowing through the supply passage 24 flows through the cooling passage 21 after flowing through the first passage 24a. Whereby, the blade ring 11 is cooled. The cooling medium that has flowed through the cooling passage 21 to cool the blade ring 11 flows through the combustor internal flow passage 22. The present disclosure is not limited to fully opening the flow control valve 25a and fully closing the flow control valve 25b. If the ratio of the first flow rate and the second flow rate described above is adjusted by adjusting the respective opening degrees of the flow control valve 25a and the flow control valve 25b, it is possible to adjust the cooling amount for the blade ring 11.

As shown in graph (b) of FIG. 3, when the cooling of the blade ring 11 is started at the time $t_3$, the cooling of the blade ring 11 is continued as long as the gas turbine 1 is in the load stable state. During the operation of the gas turbine 1, the gas turbine 1 may enter, from the load stable state, a load fluctuation state which is outside a range defined by the first upper limit value $L_{max-1}$ and the first lower limit value $L_{min-1}$ of the load during the prescribed time $\Delta t$. As an example thereof, graph (b) of FIG. 3 shows a phenomenon in which the load decreases significantly at time $t_4$. When the gas turbine 1 enters the load fluctuation state, the control device 26 stops cooling the blade ring 11.

The load stops decreasing at time $t_5$ and in this state, if the state continues where the load fluctuates within the above-described range from the time $t_5$ until the elapse of the prescribed time $\Delta t$, that is, when the gas turbine 1 enters the load stable state at time $t_5$, the control device 26 starts cooling the blade ring 11 again. Thereafter, likewise, when the gas turbine 1 enters the load fluctuation state at time $t_7$, the control device 26 stops cooling the blade ring 11, the increase in load stops at time $t_8$, and in this state, when the gas turbine 1 enters the load stable state at time $t_9$, the control device 26 starts cooling the blade ring 11 again. Although not shown in graph (b) of FIG. 3, from this point forward, such operation is continued during the operation of the gas turbine 1.

The control device 26 stops cooling the blade ring 11, once the decrease in load is started in order to stop the gas turbine 1 at time $t_{10}$. When the load becomes zero at time $t_{11}$ and the generator 7 is disconnected from the utility grid, the gas turbine 1 is stopped.

<Technical Effect of Clearance Control System for Gas Turbine According to Embodiment of Present Disclosure>

As shown in graph (c) of FIG. 3, the clearance 13 (see FIG. 2) decreases if the blade ring 11 is cooled, and the clearance 13 increases if the cooling of the blade ring 11 is stopped. That is, according to the above-described operation of the clearance control system 20, the blade ring 11 is cooled to decrease the clearance 13 when the gas turbine 1 is in the load stable state, and the cooling of the blade ring 11 is stopped to increase the clearance 13 when the gas turbine 1 is in the load fluctuation state.

The clearance 13 is formed along the circumferential direction of the turbine 6. Therefore, what is shown in graph (c) of FIG. 3 is an average value of the clearance 13 along the circumferential direction. The stationary part of the turbine 6 including the blade ring 11 does not necessarily have a uniform configuration in the circumferential direction of the turbine 6. Thus, if a temperature changes, the clearance 13 does not uniformly change in the circumferential direction with the change in temperature, but changes differently in the circumferential direction. If the stationary part of the turbine 6 has a circular shape before the clearance 13 changes, the stationary part deforms into an elliptical shape with the change in temperature (such deformation is called oval deformation).

In case where such oval deformation occurs, even if there is no problem as the average value of the clearance 13 on the basis of the load of the gas turbine 1, a portion may be generated in which the clearance 13 becomes very small locally in the circumferential direction. Such oval deformation tends to occur when the gas turbine 1 is in the load fluctuation state and subside when the gas turbine 1 enters the load stable state. Thus, the cooling of the blade ring 11 is stopped to increase the margin of the clearance 13 when the gas turbine 1 is in the load fluctuation state, and the blade ring 11 is cooled to decrease the margin of the clearance 13 when the gas turbine 1 is in the load stable state. Whereby, it is possible to deal with the case where the load of the gas turbine 1 fluctuates.

Further, oval deformation also occurs when the load of the gas turbine 1 decreases and when the load increases, and the average clearance increases when the load decreases, whereas the average clearance decreases when the load increases. Thus, when the load increases, the clearance excessively decreases from the viewpoint of not only oval deformation but also the average clearance. Even in such a case, it is possible to deal with the excessive decrease in clearance by determining that the gas turbine 1 is in the load fluctuation state and stopping the cooling of the blade ring 11 to increase the margin of the clearance 13.

Thus, although the clearance 13 may excessively decrease if the load of the gas turbine 1 fluctuates, the cooling amount for the blade ring 11 of the turbine 6 is stopped or reduced in such a case, making it possible to deal with the case where the load of the gas turbine 1 fluctuates.

In the present embodiment, as described above, although the load decreases, that is, fluctuates when the operation of the gas turbine 1 is stopped, the cooling amount for the blade ring 11 is reduced from the start of the decrease in load. Thus, it is possible to deal with even the excessive decrease in the clearance 13 that occurs when the operation of the gas turbine 1 is stopped.

<Modified Example of Clearance Control System for Gas Turbine According to Embodiment of Present Disclosure>

In the above-described embodiment, the prescribed time Δt is the predetermined time preset in the control device 26. However, the present disclosure is not limited to this mode. The control device 26 may decide the prescribed time Δt on the basis of the amount of the change in load from the value of the load that shifts within the range defined by the first upper limit value $L_{max-1}$ and the first lower limit value $L_{min-1}$ of the load or the value of the load in the load fluctuation state. Thus, it is possible to more appropriately determine whether the gas turbine 1 enters the load stable state, making it is possible to more appropriately deal with the case where the load of the gas turbine 1 fluctuates.

Figure 6:
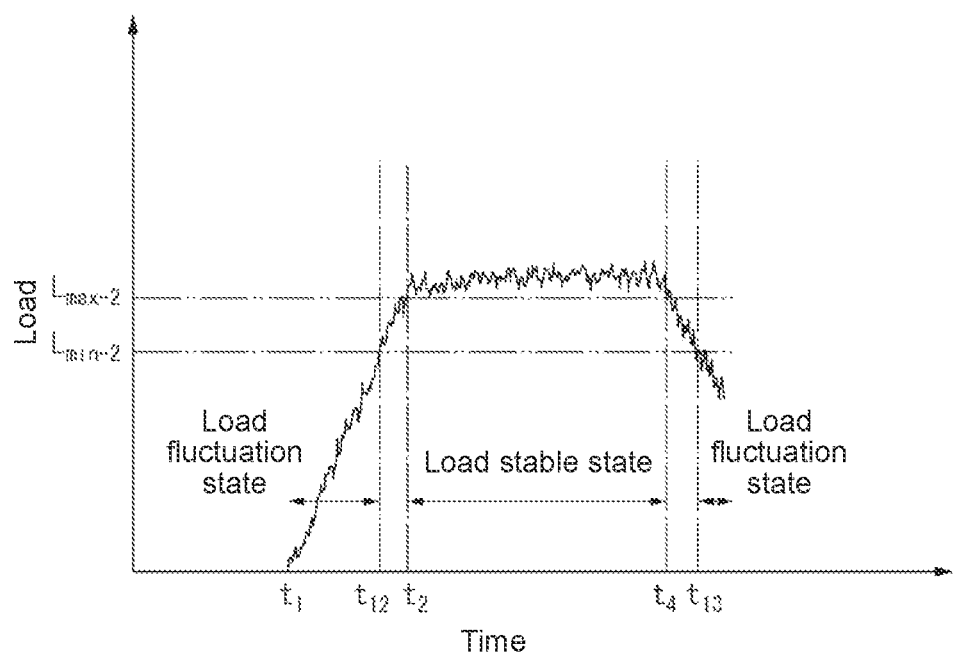
FIG. 6 is another form of a graph for describing the load stable state in the gas turbine according to an embodiment of the present disclosure.

In the above-described embodiment, regardless of the value of the load, the load stable state is entered if the load fluctuates within the range defined by the first upper limit value $L_{max-1}$ and the first lower limit value $L_{min-1}$ of the load during the prescribed time Δt, and the load fluctuation state is entered if the load fluctuates to fall outside this range during the prescribed time Δt. However, the present disclosure is not limited to this mode. For example, as shown in FIG. 6, a second upper limit value $L_{max-2}$ (for example, 9.5%) and a second lower limit value $L_{min-2}$ (for example, 80%) of the load are preset, and the control device 26 and may operate the flow control valves 25a and 25b regardless of the fluctuation range of the load, with determination that the load stable state is entered if the load is not less than the second upper limit value $L_{max-2}$ (between the time $t_2$ and the time $t_4$) and with determination that the load fluctuation state is entered if the load is not greater than the second lower limit value $L_{min-2}$ (between the time $t_1$ and the time $t_{12}$ or after the time $t_{13}$). Thus, cooling is performed when the need to cool the blade ring 11 is high on the basis of the value of the load of the gas turbine 1, and cooling is not performed when the need to cool the blade ring 11 is low, making it possible to simplify control for cooling the blade ring 11.

Figure 5:
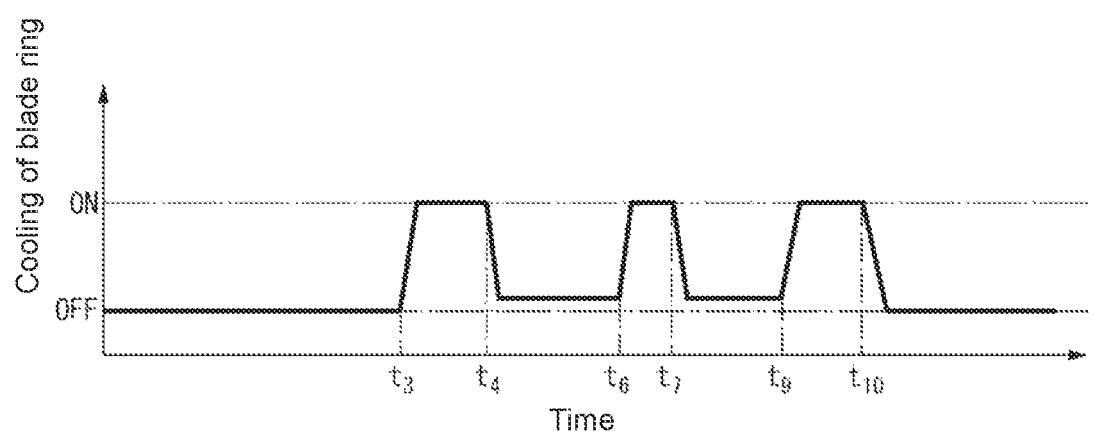
FIG. 5 is a graph for describing a modified example of the operation of the clearance control system for the gas turbine according to an embodiment of the present disclosure.

In the above-described embodiment, the cooling of the blade ring 11 is stopped in the load stable state. In this case, a state is entered in which the cooling medium does not flow through the cooling passage 21. If this state continues, drain accumulates in the cooling passage 21, and thereafter if the cooling medium flows through the cooling passage 21 again, the drain is brought into the combustor internal flow passage 22. In order to suppress the accumulation of the drain in the cooling passage 21, as shown in FIG. 5, the cooling medium may flow through the cooling passages 21 at a minimum flow rate to the extent that the cooling of the blade ring 11 is minimum, even when the blade ring 11 is not cooled. That is, instead of fully closing the flow control valve 25a, the flow control valve 25a may slightly be opened.

Further, apart from the purpose of suppressing the accumulation of the drain in the cooling passage 21, the present disclosure is not limited to the mode where the cooling of the blade ring 11 is turned on and off according to the load stable state and the load fluctuation state. The cooling amount for the blade ring 11 may be adjusted in accordance with the fluctuation range of the load in the transition from the load stable state to the load fluctuation state and the transition from the load fluctuation state to the load stable state. That is, the control device 26 may decide, according to the fluctuation range of the load, the ratio of the first flow rate which is the flow rate of the cooling medium flowing through the cooling passage 21, and the second flow rate which is the flow rate of the cooling medium bypassing the cooling passage 21 and flowing through the combustor internal flow passage 22, and may operate the flow control valves 25a and 25b so as to obtain the first flow rate and the second flow rate based on this ratio. Thus, it is possible to more appropriately deal with the case where the load of the gas turbine fluctuates.

In the above-described embodiment, the load of the gas turbine 1 is detected on the basis of the power generation amount of the generator 7, that is, directly. However, the load may be detected indirectly from another index capable of estimating the load. As such index, for example, the opening degree of an inlet guide vane (IGV) for adjusting the intake air amount of the compressor 2 can be used.

In the above-described embodiment, the air bled from the casing 3 of the gas turbine 1 is used as the cooling medium. However, the present disclosure is not limited to this mode. Part of the compressed air compressed by the compressor 2 or any fluid supplied from the outside of the gas turbine 1 can be used as the cooling medium. Thus, the supply device for supplying the cooling medium to at least either the cooling passage 21 or the combustor internal flow passage 22 is also not limited to the external compressor 23, but any device can be used depending on the cooling medium to be used. Further, the adjustment device 25 is also not limited to the flow control valves 25a and 25b, but any device capable of distributing the cooling fluid in two directions, such as a three-way valve, can be used.

The contents described in the above embodiments would be understood as follows, for instance.

[1] A clearance control system for a gas turbine according to one aspect is a clearance control system (20) for a gas turbine (1) for controlling, in the gas turbine (1) that includes a compressor (2) for producing compressed air, a combustor (4) for burning fuel with the compressed air, and a turbine (6) driven by a combustion gas generated by burning the fuel in the combustor (4), a clearance (13) between a stationary part (blade ring 11) and a rotary part (rotor blade 12) of the turbine (6), including: a cooling passage (21) which is formed in the stationary part (11) and through which a cooling medium for cooling the stationary part (11) flows; a combustor internal flow passage (22) which communicates with the cooling passage (21) downstream of the cooling passage (21) in a flow direction of the cooling medium and is formed in the combustor (4); a supply device (external combustor 23) for supplying the cooling medium to at least either the cooling passage (21) or the combustor internal flow passage (22); an adjustment device (25) for adjusting a first flow rate which is a flow rate of the cooling medium flowing through the cooling passage (21), and a second flow rate which is a flow rate of the cooling medium bypassing the cooling passage (21) and flowing through the combustor internal flow passage (22); and a control device (26) for detecting a load of the gas turbine (1) and operating the adjustment device (25) on the basis of the load. The control device (26) operates the adjustment device (25) such that the first flow rate is greater than the second flow rate when a load stable state is entered in which a fluctuation range of the load shifts within a preset range, and operates the adjustment device (25) such that the second flow rate is greater than the first flow rate when a load fluctuation state is entered in which the load falls outside the range.

According to the clearance control system for the gas turbine of the present disclosure, although the clearance may excessively decrease if the load of the gas turbine fluctuates, the cooling amount for the stationary part of the turbine is reduced in such a case, making it possible to deal with the case where the load of the gas turbine fluctuates.

[2] A clearance control system for a gas turbine according to another aspect is the clearance control system for the gas turbine of [1], wherein the control device (26) operates the adjustment device (25) such that the second flow rate is greater than the first flow rate from a start of a decrease in the load, when an operation of the gas turbine (1) is stopped.

With such configuration, although the load decreases, that is, fluctuates when the operation of the gas turbine is stopped, the cooling amount for the stationary part is reduced from the start of the decrease in load. Thus, it is possible to deal with the decrease in the clearance that occurs when the operation of the gas turbine is stopped.

[3] A clearance control system for a gas turbine according to still another aspect is the clearance control system for the gas turbine of [1] or [2], wherein the control device (26) decides a ratio of the first flow rate and the second flow rate on the basis of respective load change amounts in transition from the load stable state to the load fluctuation state and in transition from the load fluctuation state to the load stable state, and operates the adjustment device (25) so as to obtain the first flow rate and the second flow rate based on the ratio.

With such configuration, since the cooling amount for the stationary part of the turbine is adjusted on the basis of the load change amounts, it is possible to more appropriately deal with the case where the load of the gas turbine fluctuates.

[4] A clearance control system for a gas turbine according to yet another aspect is the clearance control system for the gas turbine of [1] or [2], wherein an upper limit value (second upper limit value $L_{max-2}$) and a lower limit value (second lower limit value $L_{min-2}$) of the load are preset, and the control device (26) operates the adjustment device (25) with determination that the load stable state is entered if the load is not less than the upper limit value ($L_{max-2}$), and operates the adjustment device (25) with determination that the load fluctuation state is entered if the load is not greater than the lower limit value ($L_{min-2}$).

With such configuration, cooling is performed when the need to cool the stationary part of the turbine is high on the basis of the value of the load of the gas turbine, and cooling is not performed or the cooling amount is reduced when the need to cool the stationary part of the turbine is low; making it possible to simplify control for cooling the stationary part of the turbine.

[5] A clearance control system for a gas turbine according to yet another aspect is the clearance control system for the gas turbine of [1] or [2], wherein the control device (26) determines that the load stable state is entered if the fluctuation range of the load shifts within the range for a prescribed time, and the prescribed time is decided by the control device (26) on the basis of an amount of a change in the load from a value of the load shifting within the range or a value of the load in the load fluctuation state.

With such configuration, it is possible to more appropriately determine whether the gas turbine enters the load stable state, making it possible to more appropriately deal with the case where the load of the gas turbine fluctuates.

[6] A clearance control system for a gas turbine according to yet another aspect is the clearance control system for the gas turbine of [1] or [2], wherein the control device (26) operates the adjustment device (25) such that the first flow rate becomes zero, when the control device (26) operates the adjustment device (25) such that the second flow rate is greater than the first flow rate.

With such configuration, since on-off control is performed on the cooling of the stationary part of the turbine, it is possible to simplify the control for cooling the stationary part of the turbine.

REFERENCE SIGNS LIST

1 Gas turbine
2 Compressor

4 Combustor
6 Turbine
11 Blade ring (stationary part)
12 Rotor blade (rotary part)
13 Clearance
20 Clearance control system
21 Cooling passage
22 Combustor internal flow passage
23 External compressor (supply device)
25 Adjustment device
26 Control device

The invention claimed is:

1. A clearance control system for a gas turbine for controlling, in the gas turbine that includes a compressor for producing compressed air, a combustor for burning fuel with the compressed air, and a turbine driven by a combustion gas generated by burning the fuel in the combustor, a clearance between a stationary part and a rotary part of the turbine, comprising:
   a cooling passage which is formed in the stationary part and through which a cooling medium for cooling the stationary part flows;
   a combustor internal flow passage which communicates with the cooling passage downstream of the cooling passage in a flow direction of the cooling medium and is formed in the combustor;
   a supply device for supplying the cooling medium to at least either the cooling passage or the combustor internal flow passage;
   an adjustment device for adjusting a first flow rate which is a flow rate of the cooling medium flowing through the cooling passage, and a second flow rate which is a flow rate of the cooling medium bypassing the cooling passage and flowing through the combustor internal flow passage; and
   a control device for detecting a load of the gas turbine and operating the adjustment device on the basis of the load,
   wherein the control device operates the adjustment device such that the first flow rate is greater than the second flow rate when a load stable state is entered in which a fluctuation range of the load shifts within a preset range, and operates the adjustment device such that the second flow rate is greater than the first flow rate when a load fluctuation state is entered in which the load falls outside the range.

2. The clearance control system for the gas turbine according to claim 1,
   wherein the control device operates the adjustment device such that the second flow rate is greater than the first flow rate from a start of a decrease in the load, when an operation of the gas turbine is stopped.

3. The clearance control system for the gas turbine according to claim 1,
   wherein the control device decides a ratio of the first flow rate and the second flow rate on the basis of respective load change amounts in transition from the load stable state to the load fluctuation state and in transition from the load fluctuation state to the load stable state, and operates the adjustment device so as to obtain the first flow rate and the second flow rate based on the ratio.

4. The clearance control system for the gas turbine according to claim 1,
   wherein an upper limit value and a lower limit value of the load are preset, and the control device operates the adjustment device with determination that the load stable state is entered if the load is not less than the upper limit value, and operates the adjustment device with determination that the load fluctuation state is entered if the load is not greater than the lower limit value.

5. The clearance control system for the gas turbine according to claim 1,
   wherein the control device determines that the load stable state is entered if the fluctuation range of the load shifts within the range for a prescribed time, and the prescribed time is decided by the control device on the basis of an amount of a change in the load from a value of the load shifting within the range or a value of the load in the load fluctuation state.

6. The clearance control system for the gas turbine according to claim 1,
   wherein the control device operates the adjustment device such that the first flow rate becomes zero, when the control device operates the adjustment device such that the second flow rate is greater than the first flow rate.

* * * * *